United States Patent
Boudville

(10) Patent No.: US 10,789,306 B2
(45) Date of Patent: Sep. 29, 2020

(54) BOTS FOR LINKETS AND DEEP LINKS

(71) Applicant: Wesley John Boudville, Perth (AU)

(72) Inventor: Wesley John Boudville, Perth (AU)

( * ) Notice: Subject to any disclaimer, the term of this patent is extended or adjusted under 35 U.S.C. 154(b) by 804 days.

(21) Appl. No.: 15/330,146

(22) Filed: Aug. 16, 2016

(65) Prior Publication Data

US 2018/0052926 A1    Feb. 22, 2018

(51) Int. Cl.
  *G06F 16/951*    (2019.01)
  *H04L 29/08*     (2006.01)
  *G06Q 30/06*     (2012.01)

(52) U.S. Cl.
  CPC ....... *G06F 16/951* (2019.01); *G06Q 30/0629* (2013.01); *H04L 67/02* (2013.01); *H04L 67/2823* (2013.01); *H04L 67/34* (2013.01)

(58) Field of Classification Search
  CPC ... G06F 16/951; H04L 67/02; H04L 67/2823; H04L 67/34; G06Q 30/0629
  See application file for complete search history.

(56) References Cited

U.S. PATENT DOCUMENTS

| | | | |
|---|---|---|---|
| 8,433,800 B2 | 4/2013 | Chor | |
| 8,914,042 B2* | 12/2014 | Singhal | H04L 61/15 455/456.3 |
| 9,892,190 B1* | 2/2018 | Kirazci | G06F 16/3322 |
| 2005/0240393 A1* | 10/2005 | Glosson | G06F 17/24 704/8 |
| 2006/0199612 A1* | 9/2006 | Beyer, Jr. | H04M 1/7258 455/556.2 |
| 2007/0198741 A1* | 8/2007 | Duffy | G06F 16/957 709/245 |
| 2012/0173692 A1* | 7/2012 | Lakes | H04L 67/327 709/223 |
| 2013/0110815 A1* | 5/2013 | Tankovich | G06F 16/9535 707/711 |
| 2013/0304729 A1* | 11/2013 | Jiang | H04L 67/02 707/723 |
| 2013/0334360 A1 | 12/2013 | Evans | |
| 2014/0089413 A1 | 3/2014 | Evans | |
| 2014/0365520 A1* | 12/2014 | Pujare | H04L 51/36 707/769 |

(Continued)

OTHER PUBLICATIONS

"Apps everywhere but no unifying link" by C.Dougherty, NY Times, Jan. 5, 2015.

(Continued)

*Primary Examiner* — Kannan Shanmugasundaram

(57) ABSTRACT

A Registry stores data about linkets. A linket has data about users who use it to interact with the linket owner via an app or bot. An app firm makes a bot interface for the app engine of its app. Users interact with the app engine via the app or a bot. The Registry maps from a linket to one or more of a deep link, a bot interface address and an app id. A linket have several deep links and bot interfaces. The Registry could pick a deep link closest to the device making the query. The Registry can overweight some deep links according to knowledge about the respondents at those deep links. When the Registry gets a query with a linket, and there are several deep links to pick from, the Registry can conduct a Real Time Bidding (RTB) auction to pick a deep link. A user with a bot on a mobile device uses the bot to search the Registry.

2 Claims, 13 Drawing Sheets

(56) References Cited

U.S. PATENT DOCUMENTS

2015/0154644 A1    6/2015  Saxena
2015/0156061 A1*  6/2015  Saxena ................... H04W 4/50
                                                      715/733
2016/0292728 A1*  10/2016  Kang ................ G06Q 30/0255

OTHER PUBLICATIONS

"Deep linking's big untapped potential" by M.Thomson, Venturebeat. com, Aug. 9, 2015.

* cited by examiner

BOTS FOR LINKETS AND DEEP LINKS

TECHNICAL FIELD

Deep links for mobile apps.

BACKGROUND

Mobile apps have a distinctive problem. Most are currently standalone programs that often just converse with an app server run by the company that wrote the app. The apps do not have URL links within them. In general, an app from one company does not interact with an app from another company.

Separately, it is much harder for a search engine, which is optimised to search the Web for webpages, to search arbitrary apps. There is no standard syntax equivalent to an URL or URI to enable this.

To enable such and other functionality in mobile apps has been termed 'deep linking' within apps. (The term also has an earlier use that refers to standard web pages and URL links within them. This submission does not use that earlier meaning.)

Major companies have several projects aimed at defining deep links. FACEBOOK Corp. has APP LINKS™ GOOGLE Corp. has APP INDEXING™ and GOOGLE INTENTS™ TWITTER Corp. has APP CARDS™ APPLE Corp. has APPLE EXTENSIONS™ TAHOO Corp. has 2 US patents. There are also several startups, like BIT.LY Corp., BRANCH METRICS Corp., BUTTON Corp., DEEPLINK Corp., FUKUROU Corp., HAPTIK Corp., HOKO Corp., LINKFIRE Corp., QUIXY Corp., TAP-STREAM Corp., URX Corp., WILDCARD Corp., and YOZIO Corp., each with its own initiative. The syntax and functionality vary between these company specific efforts.

We recommend that if the reader is new to the idea of deep links, to read 2 articles. "Apps everywhere but no unifying link" by C. Dougherty, NEW YORK TIMES Corp., 5 Jan. 2015. And "Deep linking's big untapped potential" by M. Thomson, VENTUREBEAT.COM Corp., 9 Aug. 2015. Both at least at this time of writing are available online. They are well written. The first article is accessible to the general reader. The second article has slightly more technical details. They give an understanding of deep links and the business potential, as understood publicly in the prior art of 2015-6.

DETAILED DESCRIPTION OF THE PREFERRED EMBODIMENT

Figure 1:
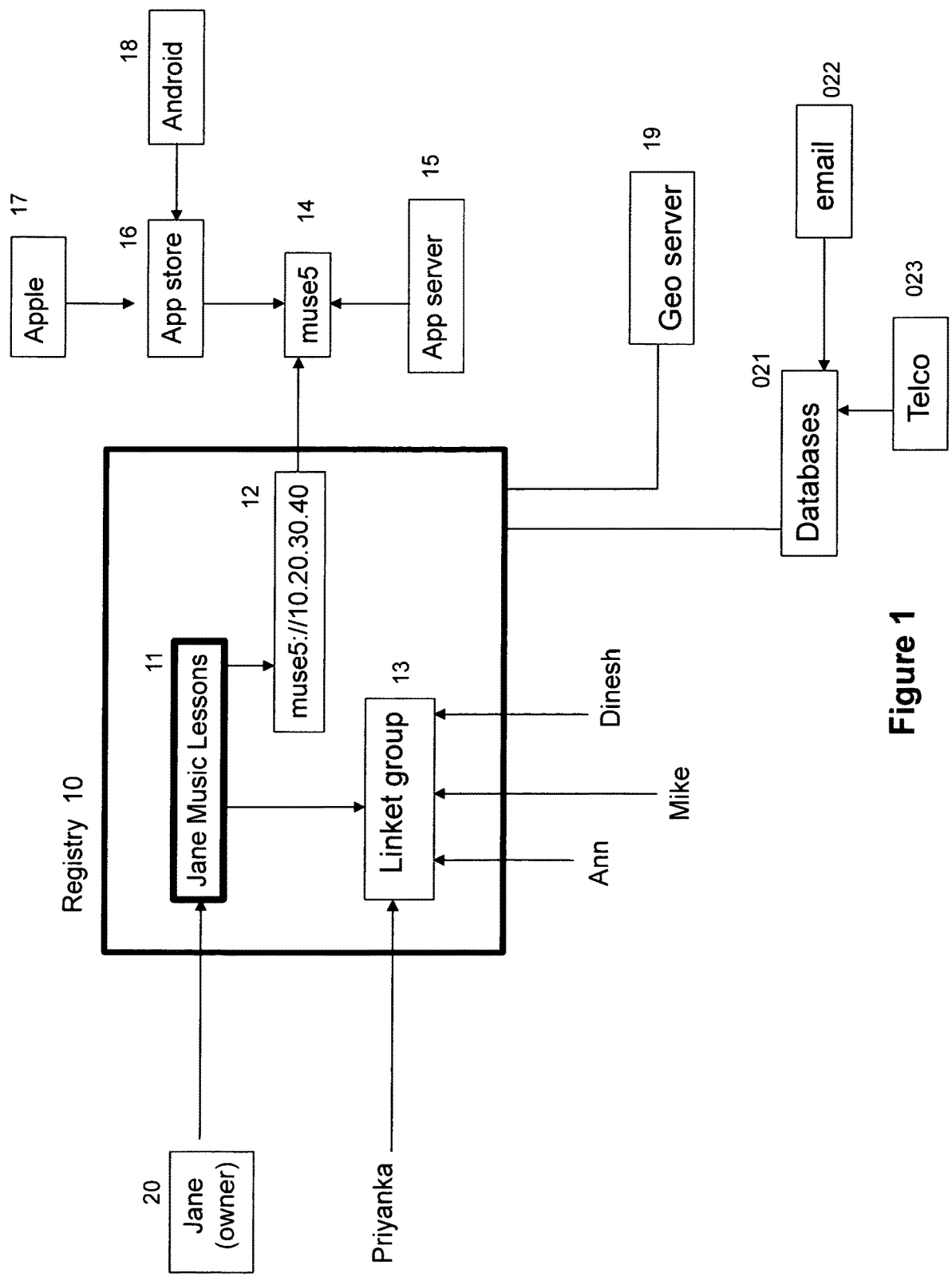
FIG. 1 shows the Registry with a linket and a group of linket users.

What we claim as new and desire to secure by letters patent is set forth in the following claims.

This submission refers to our earlier submissions to the US PTO: "Cellphone changing an electronic display that contains a barcode", filed 16 May 2011, U.S. Pat. No. 8,532,632 ["1"]; "Using dynamic barcodes to send data to a cellphone", filed 28 Jul. 2011, U.S. Pat. No. 8,348,149 ["2"]; "Transmitting and receiving data via barcodes through a cellphone for privacy and anonymity", filed 4 Oct. 2011, U.S. Pat. No. 8,707,163 ["3"]; "Colour barcodes and cellphone", filed 16 Dec. 2011, U.S. Pat. No. 8,821,277 ["4"]; "Mobile device audio from an external video display using a barcode", filed 25 May 2012, U.S. Pat. No. 8,708,224 ["5"]; "Dynamic group purchases using barcodes", filed 29 May 2012, U.S. Pat. No. 8,655,694 ["6"]; "Chirp to control devices", filed 9 Oct. 2012, US patent application 20140098644 ["7"]; "Barcode-based methods to enhance mobile multiplayer games", filed 22 May 2013, US patent application 20140349746 ["8"]; "Barcode, sound and collision for a unified user interaction", filed October 2013, US patent application 20150113068 ["9"].

We have these co-pending applications for deep linking:

"Deep linking of mobile apps by barcode, sound or collision", filed Feb. 18 2015, U.S. patent application Ser. No. 14/544,763 ["10"], "Cookies and anti-ad blocker using deep links in mobile apps", filed Jun. 8 2015, U.S. patent application Ser. No. 14/545,694 ["11"];

"Blockchain and deep links for mobile apps", filed Jul. 28 2015, U.S. patent application Ser. No. 14/756,058 ["12"];

"Different apps on different mobile devices interacting via deep links", filed Aug. 18 2015, U.S. patent application Ser. No. 14/756,208 ["13"].

"Linket to control mobile deep links", filed Oct. 19 2015, U.S. patent application Ser. No. 14/756,815 ["14"].

"Capacity and automated de-install of linket mobile apps with deep links", filed Nov. 10 2015, U.S. patent application Ser. No. 14/757,027 ["15"].

"App social network via linket and ads for mobile deep links", filed 11 Dec. 2015, U.S. patent application Ser. No. 14/757,261 ["16"].

"App group, ad bandwidth, hand off for linket and mobile deep links", filed 28 Dec. 2015, U.S. patent application Ser. No. 14/998,349 ["17"].

"App streaming, bidirectional linket, phone number for mobile deep links", filed 4 Jan. 2016, U.S. patent application Ser. No. 14/998,440 ["18"].

"Hashtag, deep link and linket for more user interactions", filed 7 Jun. 2016, U.S. patent application Ser. No. 14/999, 625 ["19"].

We described deep links and ways that these could enhance interactions between two mobile devices near each other. The current submission describes a higher level of use of deep links.

We define some terminology.

This submission is mostly about mobile devices carried or worn by people. The most common mobile device is a cellphone. We take this word to also include "smartphone". The latter term arose to describe a cellphone that also had a camera and Internet access, when such features were relatively new to cellphones. Other types of mobile devices are tablets, laptops, notebooks, netbooks, PDAs and wearable devices.

We will make frequent references to "app store" and "app server". Despite the similarity in names, these are different entities. An app store is typically run by a maker of a mobile device (like APPLE Corp., MICROSOFT Corp.), or a provider of an operating system for mobile devices (like GOOGLE Corp.). Software companies that make mobile apps submit these to an app store. So users can find the apps in the app store and download them to the mobile devices. An app server is a server run by one of those software companies. A mobile user can use her device browser to go to the website of the app server, to download the app.

When we later describe an instance of an app interacting with an instance of another app, we might say, for brevity, a statement like "the first app interacts with the second app", when strictly it should be "an instance of the first app interacts with an instance of the second app". There should be no confusion with the use of the shorter phrase. But when 2 instances of an app interact with each other, a more precise phrasing is needed, like "a first instance of the app interacts with a second instance of the app".

Related to this is a notational convenience. We shall refer to an app, and call it Alpha, for example, in the text and figures. Sometimes "Alpha" shall mean the app executable. Other times, it shall mean the id of the app, where the id is unique across "all" apps. In turn, "all" might mean across all apps in an app store for a given hardware platform. Or across all hardware platforms.

This submission has the following sections.
1: Earlier submissions;
2: Map a linket to a deep link;
3: Real Time Bidding (RTB);
4: A queue of providers;
5: Replace a linket;
6: Bots;
7: App interacting with bots;
8: Using a bot to search the Registry;
1: Earlier submissions;

This submission extends our work in submissions 14, 15, 16, 17, 18 and 19 on linkets. We encourage the reader to read those for a fuller discussion of linkets. In this section, we summarise that earlier work.

The prior art uses "deep link" to mean two apps running on one mobile device. The first app has a deep link which is selectable by the user. When the deep link is selected, something happens to cause the second app to be installed on the device. Since typically the second app is not present. The second app is run, with an input argument which causes it to start up and show a particular item or "page", rather than just a generic "home page". The "something happens" refers to different ways that different companies have, to enable this.

Our deep link, as defined in submissions 10-18, is fundamentally different. It lets 2 mobile devices interact. One category (or use case) for us (and not in the prior art) is one app running on 2 mobile devices. By one app, we mean 2 instances of the app. These 2 instances interact across the network. Another category is 2 apps running on 2 mobile devices. One app runs on one device, another app runs on the other device, and the apps interact across the network. Our deep link is for (though not exclusively) multiuser interactions. The category of one app on 2 devices can be for multiplayer games. Or even a single player game, where the second device runs a second instance of the game in spectator mode. The second device screen shows the game window of the first device. But the second device cannot alter the game position on the first device. Read only for the user of the second device. (There are some caveats for situations where the second device might make some alterations.)

FIG. 1 has item 12, which is our deep link. The example in item 12 is muse5://10.20.30.40. Muse5 is a placeholder for an app id. The app id is typically assigned to the app when it is in an app store, by the entity running the app store. The other part of the deep link in this example is 10.20.30.40. This is the network address of a computer program run by the linket owner. The example address is for Internet Protocol version 4. It generalises to IPv6 or to other types of networks.

We stress that the format of the deep link in FIG. 1 is arbitrary. In more general terms, our deep link has at least 2 items. An id of an app. And a network address. The deep link could have more entities, as described in our earlier submissions.

We define a "linket" to be the label of a deep link. The linket can be expressed in Unicode. The linket can be case sensitive. Unlike domain names. This improves the readability of expressions. Case sensitivity is moot for languages like Chinese or Hindi which do not have the concept. The linket can have (but not necessarily) white space.

The linket lets individuals have a personal brand associated with themselves. This uses the following observations. Many (most ?) people in many countries now have cellphones. A user's cellphone becomes an extension of herself, as has been observed. It is the most common type of personal computer in the world.

A person can own a linket. A corporation can also own a linket.

Another trend is the rise of the so-called gig or freelance economy, as exemplified by companies like UBER Corp., LYFT Corp. and AIRBNB Corp. letting individuals offer their services. Where the labour market tends to a friction free state. Our linket and the personal branding it offers is an enabler of the trend. However the hardware barrier to entry of a person owning a linket is much cheaper. For AIRBNB Corp. the user needs to own (or rent) a home. To own can cost over $US300 000. For UBER Corp., the user needs to own or rent a car. To own can cost $US20 000. In contrast, to use a linket requires a cellphone. A top of the line mobile phone can cost $US600. One to two orders of magnitude cheaper than the other cases.

For descriptive simplicity in what follows, we shall write the linket as a string enclosed in quotes. This is meant to describe its string contents in an understandable way that is independent of a choice of format of the delimiters.

2: Map a Linket to a Deep Link;

See FIG. 1. There is Registry 10 and Jane 20. She teaches music. She is the owner of the linket "Jane Music Lessons" 11. This maps to the deep link 12, muse5://10.20.30.40. Muse5 is the id of the music instructional app that Jane's students use. For simplicity, we assume that she also uses the same app in a teacher mode. The 10.20.30.40 is the Internet address of the instance of her app.

The arrow going from deep link 12 to the item 14, muse5, when item 14 sits outside the Registry, means that the app binary is typically not kept in the Registry. Instead, the app can be downloaded from the app server 15, run by the company that owns muse5. Or the app is downloaded from the app store 16.

FIG. 1 depicts one app store. In practice, there are several. One is from APPLE Corp. 17, and one from ANDROID™ 18. There can be others. MICROSOFT Corp. could have an app store. AMAZON Corp. could have an app store. Etc. Currently, there are 2 main cellphone families. APPLE Corp. and ANDROID™. But FIG. 1 does not preclude the presence of other and future cellphones, with other app stores.

FIG. 1 can be applied to users using other types of mobile devices. Like Augmented Reality (AR) or Virtual Reality (VR) devices that might be worn by users. Plus FIG. 1 can be applied to non-mobile devices. Like AMAZON ECHO™. This is a consumer device used in a static location, accepting input exclusively or primarily via audio input.

For any type of device, where the user speaks to command the device, instead of via an electronic screen, our linket can be especially useful. A linket is a brand, where the linket presumably is easy to remember by an end user. In contrast, a deep link has some app id and a network address. Note that the deep link example in FIG. 1 has an app id "muse5". An actual app id is unlikely to be so short or meaningful.

As a practical matter, a user cannot be expected to remember a deep link. Especially when she has to say a command to a device. On a screen, a deep link, whether in our format or another format, might be clickable. So while lacking a clear brand semantic, the deep link might have accompanying text explaining what it is about. But with no screen, the user has to dredge up a command from memory. It is far easier for her to say to her device, "Get me Jane Music Lesson" than "Get me muse five colon slash slash ten dot twenty dot . . . ".

FIG. 1 shows the Registry interacting with an external Geo server 19. This server has knowledge about geographic databases. There has now been vast work done on various such databases by firms like YAHOO Corp., GOOGLE Corp. and ESRI Corp. The point about FIG. 1 showing the geo server separate from the Registry is that the Registry might avail itself of one or more of those external databases, rather than have to rebuild a large corpus of geographic data and methods. In this way, the Registry can focus on its core competences.

FIG. 1 might include other external databases like item 021. For example, these might include databases of users at email providers like GOOGLE Corp. or MICROSOFT Corp., as in item 022. It could include databases of phone numbers and users at telecom providers like ATT Corp. and VERIZON Corp., as in item 023.

FIG. 1 also also shows several users (aka. students) of Jane. Priyanka, Ann, Mike and Dinesh. They are not labelled separately. They are shown connected to a section of the Registry database called a linket group, associated with Jane's linket. Note that in this submission, the phrase "linket group" refers to users of a linket, and not to a collection of linkets. (Unless otherwise indicated.)

Each user uses a device, which can be a mobile device, and in turn which can be a cellphone, to interact with Jane via her linket.

Jane, the linket owner, can let her users find and communicate with each other. A user can define a nickname or handle, along with some optional self-information. This can be entered via a webpage hosted by the Registry or in a Registry app. The data is then stored in the Registry.

Figure 2:
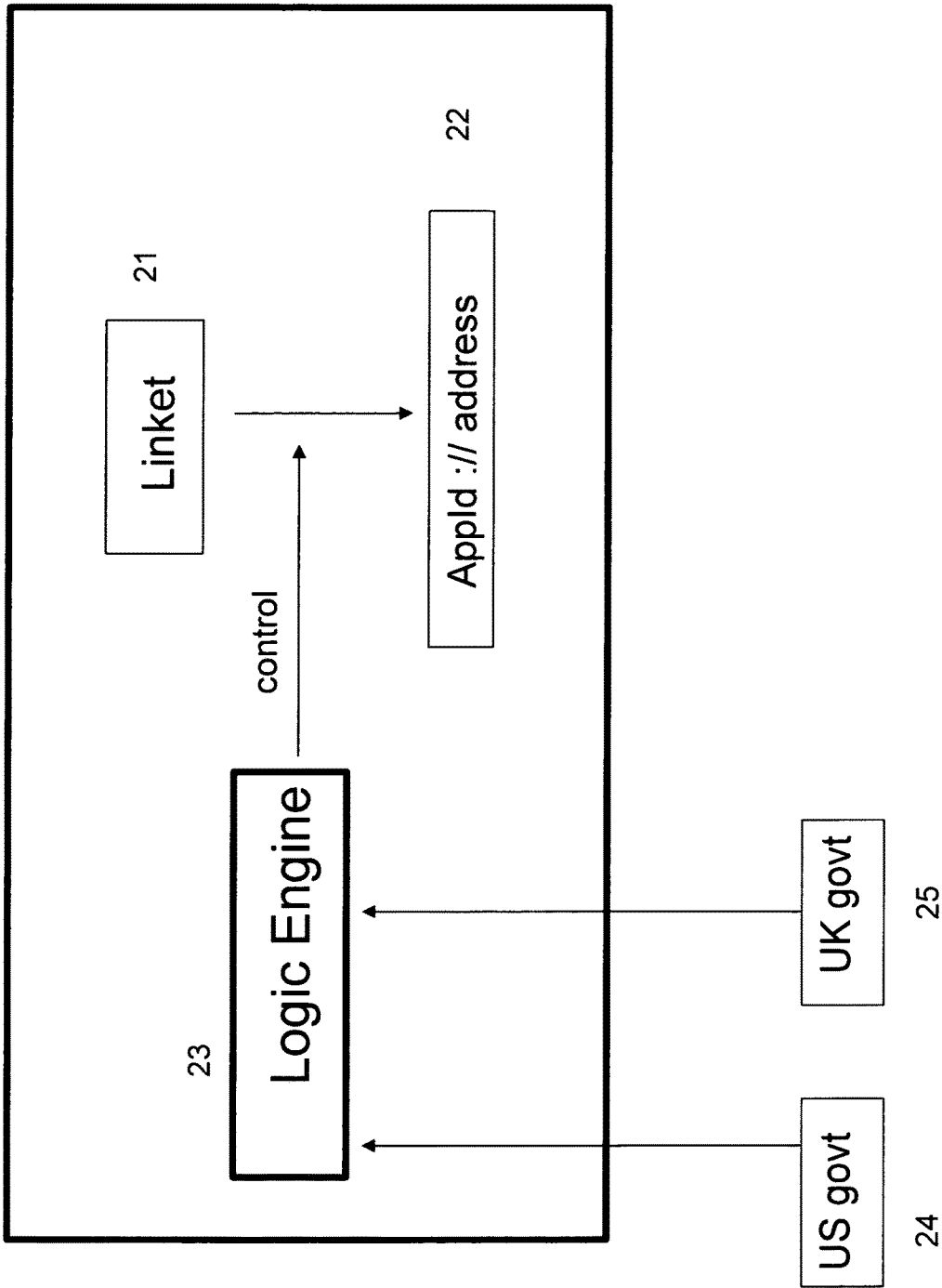
FIG. 2 shows a logic engine controlling the map from a linket to a deep link.

See FIG. 2. It shows Registry 20. In it is a mapping from a linket 21 to a deep link 22. The latter is shown has having an app id and a network address. (There could be other components of the deep link.) The arrow from the linket to the deep link designates this mapping. It is the fundamental task of the Registry to maintain this mapping. Item 23 is a logic engine that controls this mapping. It can be of arbitrary complexity. It can access databases inside the Registry and external databases.

One case is where a linket has a set of different deep links. The deep links differ in the network addresses. See FIG. 3. It shows linket 32. This points to 4 deep links. Item 33 is one such deep link, symbolically written as App://1, where "1" means a given network address. Item 34 is another deep link, written as App://2, where "2" means a different network address. Likewise for items 35 and 36. All the deep links use the same app. This is a scenario where the linket has 4 affiliated devices at different locations, simultaneously able to service queries. The devices might have human users controlling them. Or some or all of the devices could be fully automated. Depending on the types of anticipated interactions, making a fully automated device at a deep link address may or may not be possible.

The Registry can find an approximate geographic location of each of the addresses in the deep links. It also does so for the network address of user device 31, which sends the linket to the Registry. The Registry can reply with a given deep link. One criterion is to pick the deep link pointing to a device closest in the geographic sense to the user device. Or, perhaps simpler is to use a metric based on the network addresses of the user device and the deep links.

Figure 3:
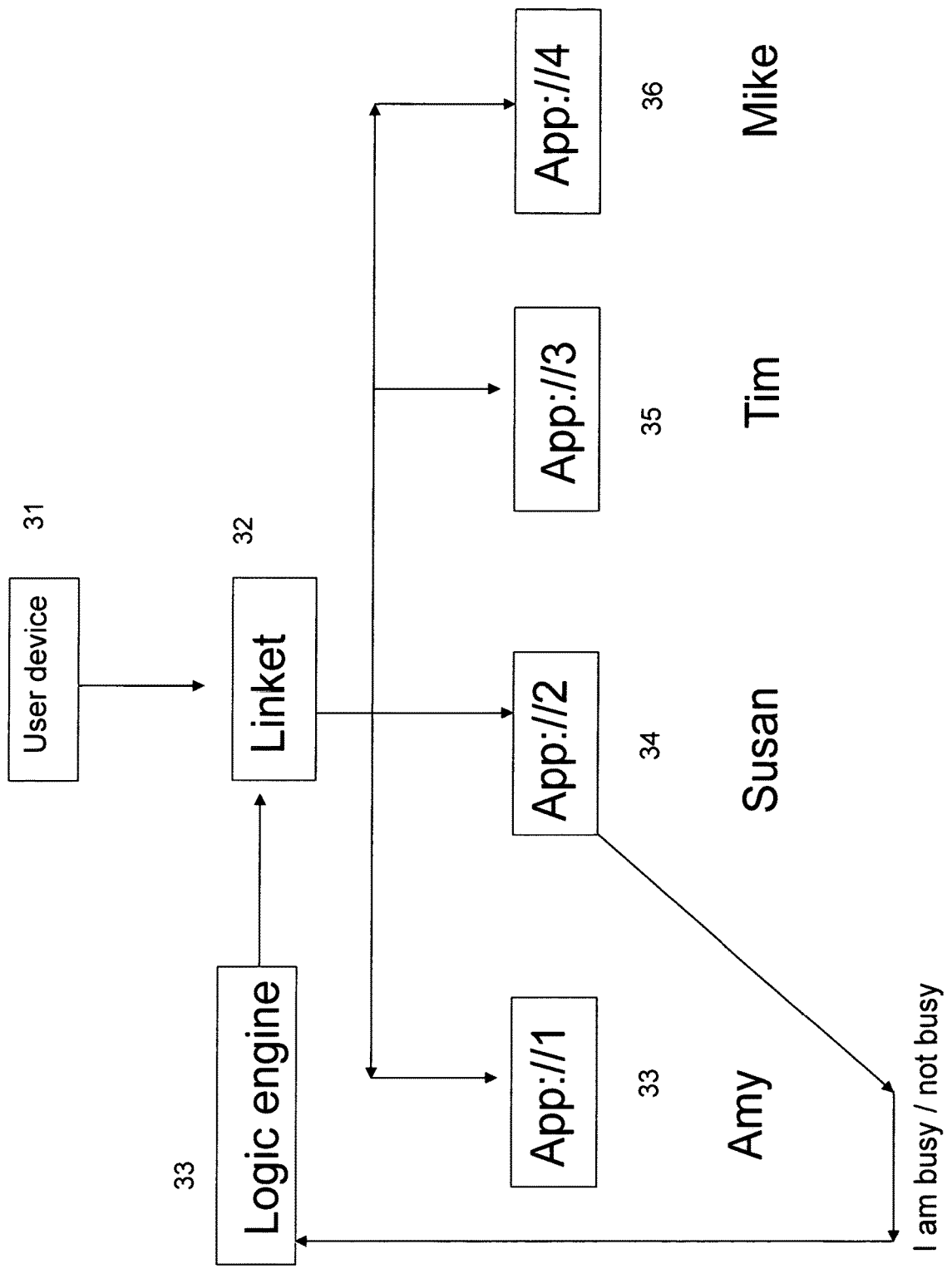
FIG. 3 shows a user device sending a linket that points to several deep links.

The previous steps can be amended. For example, a given device, say for item 34, is fully loaded handling existing users. It sends a signal to the Registry, telling it not to send the deep link of 34 to any more new user devices. The Registry complies. In FIG. 3, this is shown as the arrowed lines from item 34 to the logic engine 23. These lines have the label "I am busy/not busy". Thus there is a feedback loop from a device at at deep link address to the Registry.

So when queries with the linket come to the Registry from various instances of user device 31, the Registry will pick one of 33, 35 or 36, and send that deep link to 31. Until such time perhaps when item 34 sends another signal to the Registry, saying that it can now handle more new users ("I am not busy"). Possibly enough of the existing users of 34 have ended their interactions with it, freeing up 34.

A second case involves the device at the address of a deep link having a maximum distance. If the distance between the device and a user device (which sends the linket to the Registry) is greater than the maximum distance, then the Registry will not reply with the deep link of that deep link device. This can be for a case where the latency (delay) is set to a maximum time, corresponding to that maximum distance. The interaction between the app instance on the user device and the app at the deep link device might have some real time constraints that impose this maximum latency. Maybe a video stream or conversation.

As a subcase, all the devices in the deep links might have this maximum latency.

A third case might stem from external legal constraints. In FIG. 3, suppose deep links 33 and 34 have addresses in Canada. The interaction by those devices (and their users if applicable) with a general user might be restricted by Canadian law to only where the general user is in Canada. Suppose 33 and 34 are in Vancouver, British Columbia. User device 31 is in Toronto. And 35 and 36 refer to devices in Chicago. Items 35 or 36 are closer to 31 than 31 is to either 33 or 34. But the Registry should reply to user device 31 with only 33 or 34.

A fourth case is where the deep links have different app ids, as well as different network addresses. Suppose that the app for 33 is from a firm in Britain. While the apps for the other deep links refers to a different app from a firm in the US. The app for 33 has been certified as meeting British security standards for interacting with users in Britain. The other app has not. If the user device is in Britain, the Registry should return the deep link for 33.

The third and fourth cases can be generalised as follows. For an app in a deep link, the Registry can, to the best of its ability, see if there regional restrictions on where the app should be run. These regions might be nations or areas within a nation (territory, province, town etc). If these restrictions exist, when the Registry gets a linket from a user device, where the linket could map to the app, the Registry should find the location of the user device as best it can. And apply the regional restriction. If the location violates the restriction, the Registry should map the linket to a non-violating app if possible. If not, the Registry should return an error to the user.

FIG. 2 shows items 24 and 25, designating examples of the US and UK governments, feeding their regulations into the logic engine of the Registry. Other national governments could be included.

A fifth case is to consider where the deep links refer to people providing a service or good and getting paid for this. See FIG. 3. Item 33 is being run by Amy, 34 is run by Susan, 35 is run by Tim, and 36 is run by Mike. The first 2 providers are women, the other 2 are men. And suppose that all are in the same country. That country may have anti-discrimination rules that require female providers to get referrals in proportion to the fraction of females amongst all providers. This can be considered a type of load balancing. So in FIG. 2, Amy gets 25% of the referrals, Susan gets 25% of the referrals and so on. The Registry can perform this, perhaps with programmatic input from an external source, like the government.

This can be taken further. Suppose women are considered underrepresented. The government wants an affirmative action or positive discrimination effect. So above, instead of Amy and Susan getting 50% of the referrals, the government wants them to get 60%. This requirement can be passed into the logic engine of the Registry. It is easy for the engine to weight the mapping from the linket to the deep links so that, say, Amy gets 30% of the referrals, Susan gets 30% and each of the men gets 20%.

This particular example used sex. Other criteria are possible—religion, age, ethnicity etc. One instance might be where all the deep link providers in FIG. 3 are from India. Suppose Susan and Tim are dalits ("untouchables"), and they and Amy and Mike are Indians. India has policies that grant dalits and members of other backward castes a measure of affirmative action in some circumstances. Here the Registry might overweight Susan and Tim for this reason.

Another instance uses sect. Imagine the providers are in Pakistan. Amy and Mike are Sunnis. Susan and Tim are Shia. Suppose the government has an affirmative action plan for Shia. The Registry can overweight Susan and Tim.

Figure 4:
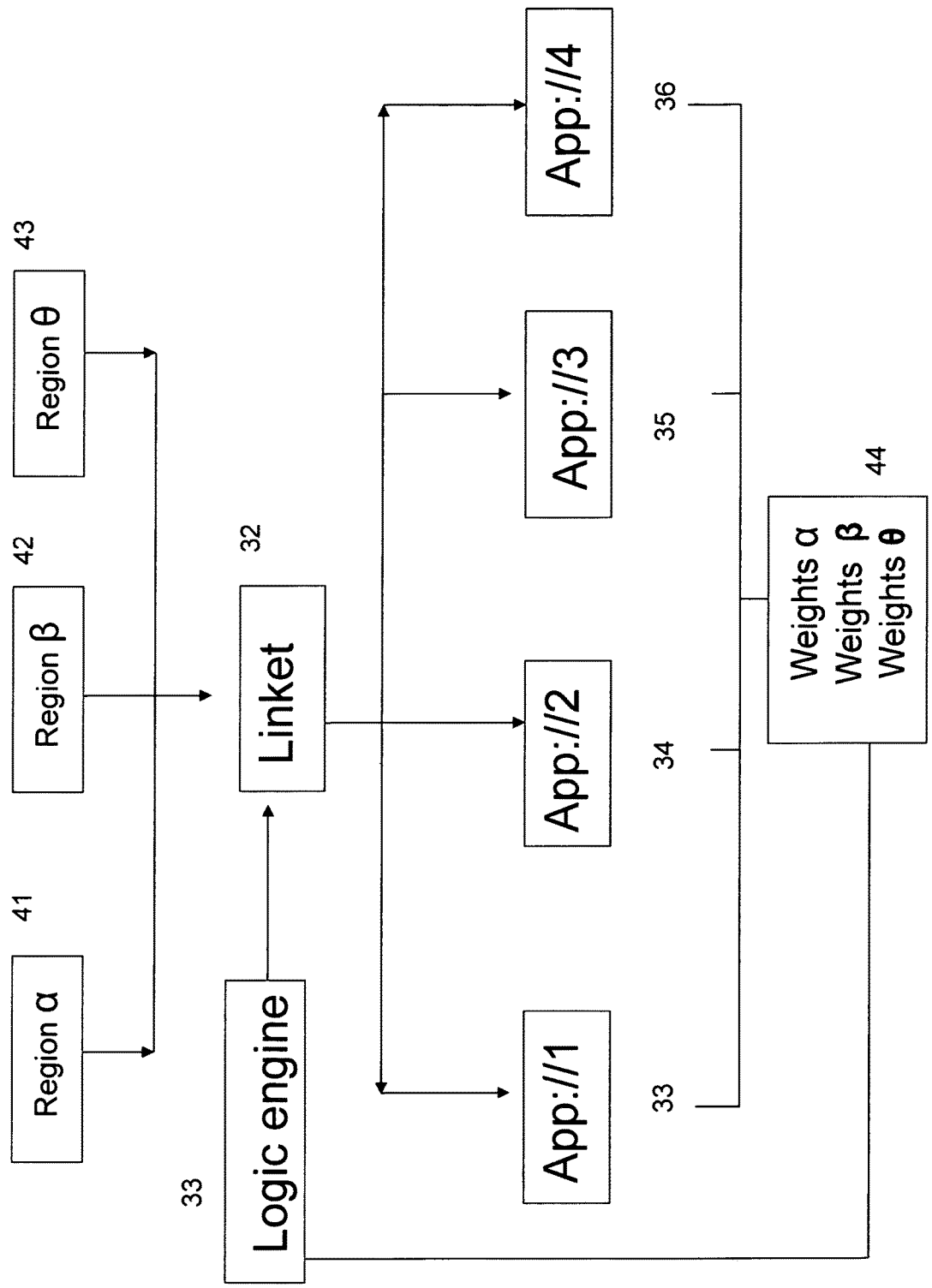
FIG. 4 shows weights for deep link providers.

A sixth case is where there are two or more sets of weights. Each deep link has a weight from each set. Here, the Registry might choose a given set of weights based on properties of the external device that sends a linket. See FIG. 4. Suppose the user devices come from one of Region Alpha (item 41), Region Beta (item 42) or Region Theta (item 43). There are 3 sets of weights for the deep link providers, in item 44. If a user device is found by the logic engine to come from Region Alpha, then the engine picks the weights Alpha. This is a set of weights assigned to each provider. The engine uses the weights to decide which provider will service the query.

This is where the weights are grouped according to region or location of the input user device that submits a linket. Other criteria are possible. One can be the type of user device. If the device is an APPLE™ device, then this can be 41. If it is an ANDROID™ device, then this is 42. Otherwise it is 43. This assumes that the Registry can make a estimation of the device type from the initial query. The point is that for this linket, if a user device is a given type, and the provider device is the same type, then the user experience for one or both of the user or the provider is enhanced. So the weights for an APPLE™ device can be 0 for providers with non-APPLE™ devices and then distributed evenly across providers with APPLE™ devices.

A seventh case extrapolates from earlier cases. The query with a linket also has criteria applied to the deep links. The query could be in some predetermined format, probably published by the Registry. A user making the query might want only a deep link respondent from Canada, for example. So here a query allows for geographic restrictions.

The Registry might run the query criteria through government anti-discrimination rules, which could lead to the query being rejected entirely, or modified.

Nor is the above discussion restricted to a government imposed regulation. There might be guidelines about the linket mapping that come from an industry body or standards organisation. The Registry may have agreed to conform to how the guidelines might be applied to the linket mapping.

Figure 5:
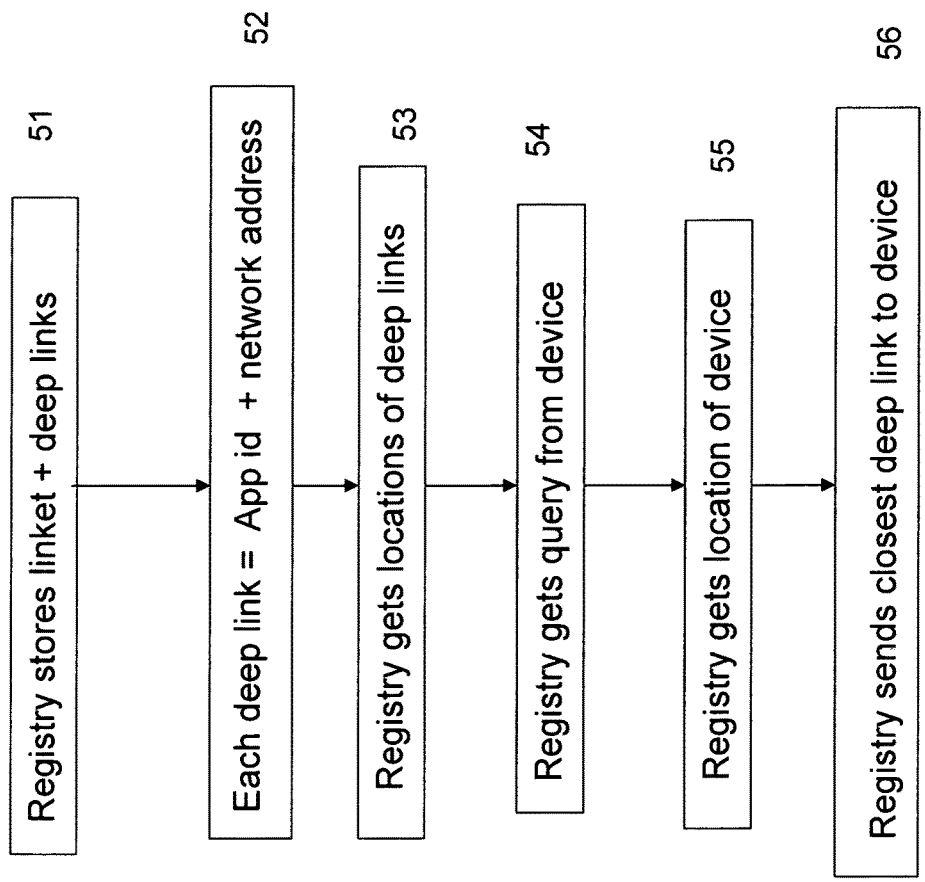
FIG. 5 is a flow chart of the Registry mapping from a linket to a deep link.

FIG. 5 is a flow chart of the base method of this section. Item 51 is the Registry storing a linket and a set of associated deep links in its database. Item 52 describes each deep link has having an app id and a network address id. Item 53 describes how the Registry gets a location for each deep link, as a function of the network address. Item 54 is the Registry getting a query from an external device, with the linket. From which flows item 55, where the Registry gets the location of the external device. Then item 56 is the Registry finding the closest deep link and sending that as the reply to the device.

3: Real Time Bidding;

See FIG. 3. The address of user device 31 is in a neighborhood of addresses. From the previous history of users contacting the Registry, the engine can get an average profile of what those users submitted as linkets. And of course this can be done for the current address of 31. Consider those users in the neighborhood who picked the specific app in FIG. 3. If that app sold items, and the transactions are not known to the Registry, then the app firm knows the purchasing history of the neighborhood. The Registry does not. The people using the app as deep link providers (Amy, Susan, Tim, Mike) know their own income history from the neighborhood.

Thus the Registry can allow Real Time Bidding (RTB) from the providers. In the time interval between when the user 31 sent the linket to the Registry and when the Registry replies with a specific deep link, the providers bid for the (potential) business from user 31. Based on the specific history of that address or a neighborhood of the address. The Registry contacts the providers with the information about the user 31. The providers had earlier given contact information to the Registry for this purpose.

RTB is well known in the context of web pages. Before or while a web page is shown on a browser, there is an automated RTB auction involving ad servers. A given ad server wins the auction and places its ad in the web page.

The difference is that in this submission, the winner is analogous to whoever writes the entire web page, so to speak.

This just used knowledge of the address of the user device. If more information is known about the user or her device, the providers can also use that to determine their bidding. The Registry can pass whatever extra information it has in that contact to the providers.

If a deep link provider is a computer program (perhaps a bot), then it can bid in the auction just as the ad server programs bid for web pages. But suppose the provider is a person. The user wants to interact as soon as possible. The RTB auction should close quickly. The human provider can have previously set up an auction agent program on her device. The agent gets the electronic message from the Registry with information about the user 31. The agent has been set up with instructions about how to bid. Like a maximum bid. This might or should depend on analysing (quickly) the information from the Registry.

A variant to rapidly ending the auction is for the Registry to reply to user 31 with a message, for example, "I will send a deep link later (but as soon as possible)". The Registry conducts the RTB auction. The extra time makes possible more manual involvement by providers. When a winner has been found, the Registry sends the corresponding deep link to the user.

4: A Queue of Providers;

FIG. 3 depicts a group of deep link providers currently available to service a linket query. Another configuration is possible. A queue of providers. The provider at the top of the queue gets the current query. Or it gets the next n queries, if it can handle several users. After which, the provider is popped off the stack (perhaps to go to the end of the queue). The next query goes to the new provider at the top of the stack. This was described in submission 14.

Figure 6:
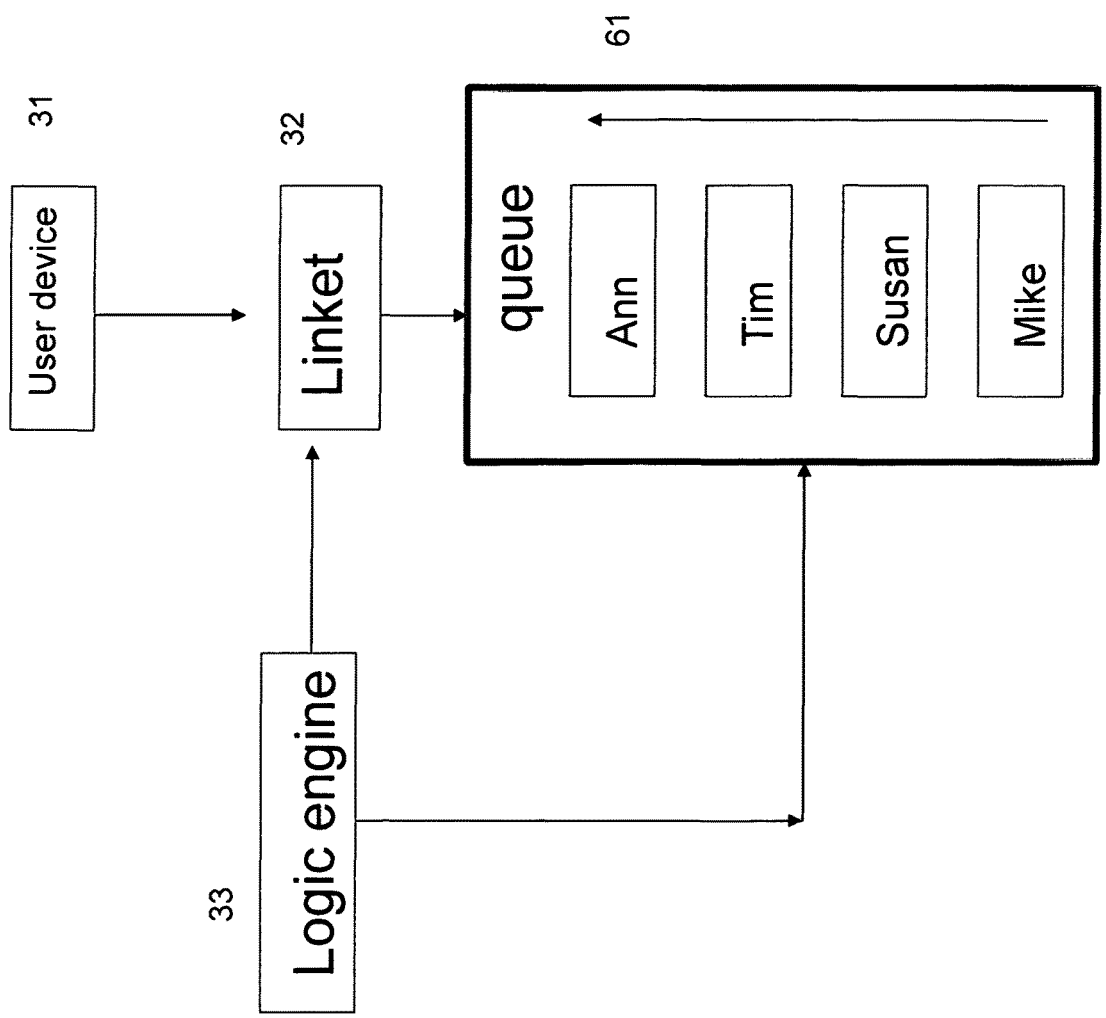
FIG. 6 shows a queue of deep link providers controlled by the logic engine.

FIG. 6 shows item 61 as the queue. The vertical arrow inside 61 designates the direction of the queue. Ann is at the top of the queue. Normally she would get the next query from user 31. In this submission, the logic engine can reorder the queue. It can move providers around. So depending on information about user 31, Tim or Susan could service 31 instead of Ann.

5: Replace a Linket;

When user device 31 sends a linket to the Registry, the engine might occasionally redirect to a different linket. One reason is based on the region of the user device. Suppose the device is not in Canada or the United States. The linket points to an app in the deep link. The app has geographic restrictions that says it cannot be used for interactions with someone outside those countries. The app may have similar restrictions on the app providers. But these can be assumed to already be known and used by the engine. So if user 31 is in Britain, the engine does not redirect to any of the linket's deep links.

If the linket points to several deep links, and some of those use another app without the restriction, then the engine picks from the latter deep links. But suppose no such deep links are valid.

Instead, the engine can find another linket, that points to a different app lacking this restriction. The app would be for the same general purpose as the first app.

The engine can reply to 31 with the new linket. With an accompanying message explaining that it cannot service the first linket. And perhaps with information about the new linket and about the app it uses. The message can have 'yes' to tell the Registry to use the new linket. Or 'no' if the user rejects the new linket.

A variant is where the message includes an instance of a deep link pointed to by the new linket. This speeds things up. If the user is ok with the new linket, she can pick the supplied deep link, avoiding a second interaction with the Registry.

6: Bots;

A bot is a software program that lets the user engage with it in a conversation. This can be via her typing her end of the interaction or by her speaking into the machine running the bot. In this submission we consider both forms to be equivalent. External to this submission, a major proposed potential for bots is for these to run on mobile devices (like cellphones), where the user speaks into her device. A mooted advantage of a bot is to get around a possible problem with mobile apps. Downloading a new app onto the device can take time and bandwidth. And when an app is installed, it occupies precious (ie. limited) space on the device.

In contrast, a suggested intent by others promoting bots is that the device has only a few bots or just one bot installed. Less space than a multitude of apps. When the user asks the bot, her queries are digitised and typically sent (in compact form) remotely to a bot server. The latter might use Artificial Intelligence (AI) or deep learning to answer. The AI has access to multiple databases of third parties. It uses those to answer the user's questions. The word "bot" encompasses both the bot program on the mobile device and the external bot server.

Third parties might write custom bot back ends that would be accessible by the bot. The bot server would have an API that lets the third parties interact with the bot and hence with the user. This differs drastically from the current situation on mobile devices (especially phones), where third party apps are written. An app has a graphical front end installed on the mobile device and (commonly) a back end that is the app server.

In this section, we describe how bots can be adapted to fit into our linket structure.

Figure 7:
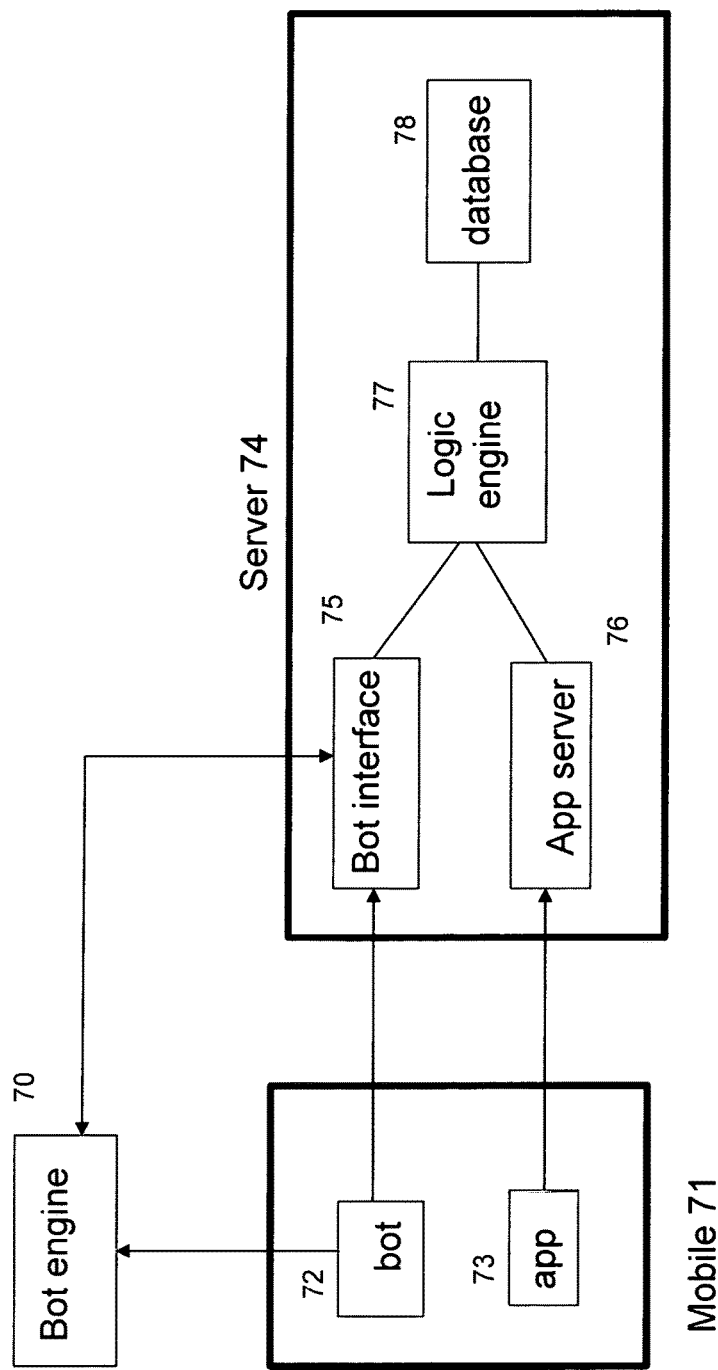
FIG. 7 shows a mobile device interacting with a bot and app server.

FIG. 7 shows Mobile 71, which is a mobile device. It interacts with Server 74. The latter has a logic engine 77. In most cases, the engine controls or can access database 78. For simplicity FIG. 7 depicts the database as residing entirely in Server 74. But this is not a necessity. Database 78 might be distributed over several devices, where these devices are likely non-mobile. The devices might be in one location, like a data center, or distributed over several locations (data centers).

Logic engine 77 has one or both of a bot interface 75 and an app server 76 that are its "front ends". If there is only app server 76, then the entire Server 74 can be imagined to be a standard app server. If there is only bot interface 75, the Server 74 can be imagined to be a standard bot server.

The company owning Server 74 might write both the bot and app parts to offer alternate ways for its logic engine and database to be used. To maximise the demand.

As a matter of terminology, we label item 75 as "bot interface". Loosely, the company making server 74 and its components might describe item 75 as a "bot". Currently (2016), this appears to be the case in the prior art. If item 75 interfaces with bot 72, then this can lead to confusion. Hence we use our term for item 75.

The point about bot 72 on mobile device 71 is that there is no need for every firm with server 74 to install its own bot 72.

One case is where some users carry a small mobile device, perhaps because it is cheaper than a mobile device with a larger screen. Typical apps would not run well on the small mobile device. So using bot 72 in an audio manner may be preferable to them. But other users have larger mobile devices and prefer the visuals and audio of an app. They would interact with the logic engine 77 via app 73 and app server 78.

Another case is a female user with a smartphone. She prefers to use apps. But in some instances, like watching a movie or driving a car, she does not want to use her device screen. She uses bot 72.

An important case is where the Registry itself can have the configuration of Server 74. The Registry has a bot interface, to interact with external bots. It might also offer an app, and thus have an app server.

On a given Mobile 71, bot 72 is assumed to be pre-installed. Perhaps it came with the operating system of Mobile 71. Or the user has at an earlier time installed bot 72. Bot 72 communicates with its bot engine 70, which is depicted outside Mobile 71.

Bot 72 might interact with bot interface 75 (if the latter exists.) On that Mobile 71 or in another instance of Mobile 71, there might be app 73 installed. This is the app corresponding to app server 76 (if the latter exists).

A remark should be made about the terminology in FIG. 7. There is bot engine 70 and bot interface 75. Bot 72 and bot engine 70 are typically made by the same company. While bot interface 75 is made by the company that made Server 74, and this company is in general different from the previous company.

Also, FIG. 7 depicts bot 72 as communicating with bot interface 75. There is a different configuration where the interaction is bot 72 to and from bot engine 70, and the latter interacts to and from bot interface 75. The arrows between bot engine 70 and bot interface 75 designate this. Bot 72 does not talk directly with bot interface 75. The arrow between bot 72 and bot interface 75 is non-functional in this configuration.

We consider both to be equivalent. Unless explicitly discussed otherwise.

Now suppose a logic engine permits a multiuser interaction. See FIG. 8. One user we can term a "tutor" if the engine is for teaching. Another term might be "guide" or "expert". Or simply the first player in a multiplayer game. Tutor device 81 is supposed to have one or both of bot 82 or app 83. When we say 'both', this implies that both exist.

Figure 8:
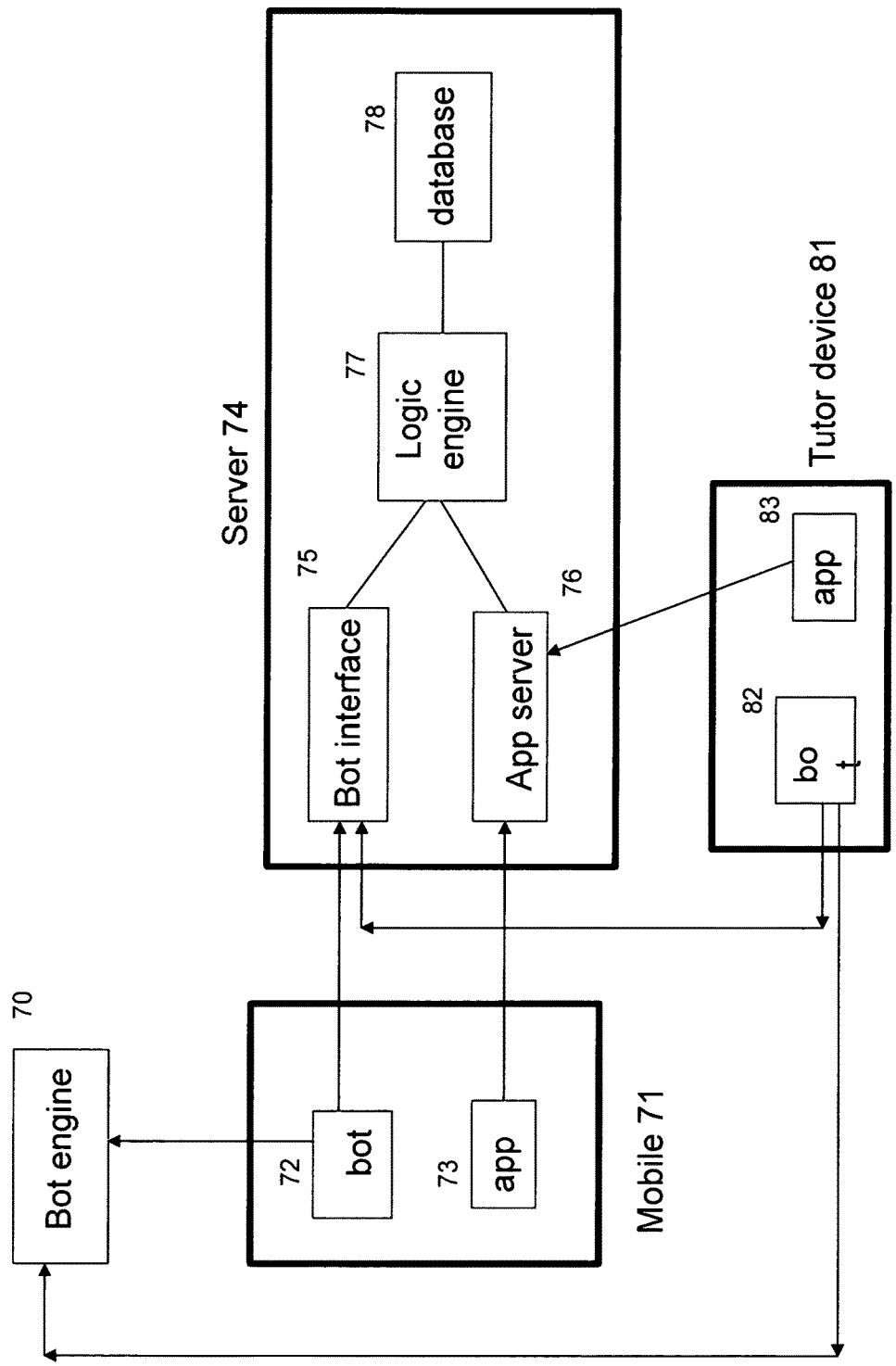
FIG. 8 shows student and tutor devices interacting with a bot and app server.

In FIG. 8, the apps on Mobile 71 and Tutor device 81 do not interact directly. They do not necessarily know the other's network address. Instead, they interact via Server 74 and its app server 76.

FIG. 8 shows another possibility of Mobile 71 and Tutor device 81 interacting via their bots. The bots interact via bot engine 70 or via bot interface 75. One scenario is that Jane uses her bot to list herself as available for tutoring. This can be stored in the database of bot engine 70. Ann talks to her bot 72 to search for a tutor. This connects to bot engine 70. Then bot 72 or bot engine 70 might interact with bot 82. The end result is that Ann and Jane interact, via an initial use of their bots.

Figure 9:
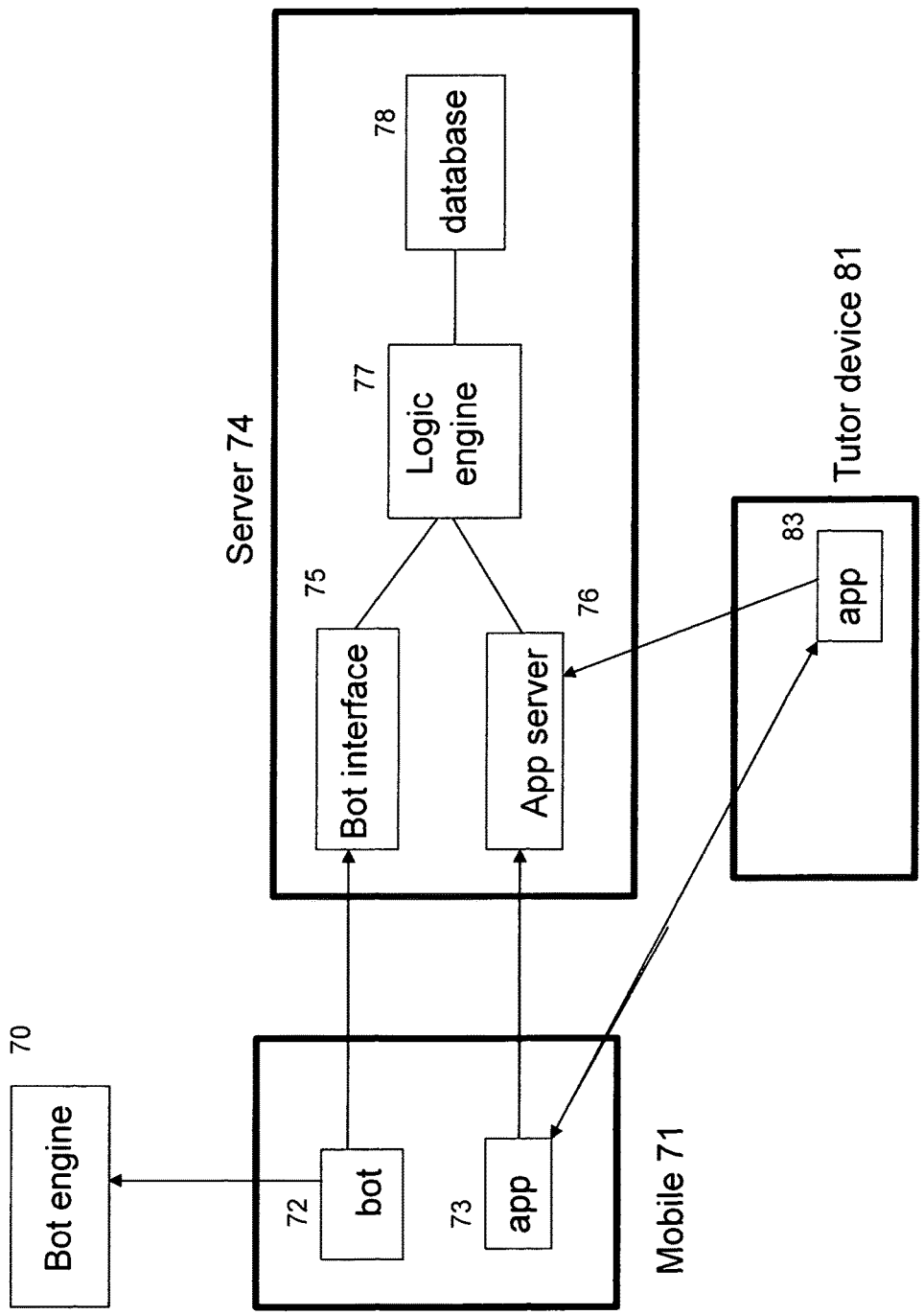
FIG. 9 shows student and tutor devices interacting directly via apps.

In contrast, FIG. 9 depicts a configuration where Mobile 71 and Tutor device 81 interact directly. The scenario where both users are interacting via the apps on their devices. The app instance on Mobile 71 and the app instance on Tutor device 81 have each other's network address.

But FIG. 7 has an initialisation aspect. Similar remarks pertain for FIGS. 7 and 8. By assumption, bot 72 is already present on Mobile 71. It has a hardwired connection to bot engine 70. But app 73 is not initially present. Suppose app 73 is somehow installed. Then like most apps, it knows from its startup parameters that it was installed with, or embedded in its binary, the address of app server 76 of Server 74. So the arrow from app 73 to app server 76 is well defined, if app 73 gets installed.

A second issue is the arrow going from bot 72 to bot interface 75. Initially it does not exist. This would be defined when bot 72 and its bot engine 70 have interacted with the user. She asked some questions, from which bot 72 got enough information to connect to the address of bot interface 75.

For the case of when app 73 is not installed, and how to go to the situation where it is installed, we discussed in earlier submissions how to use a linket (and its Registry) to install app 73. There was no involvement of bots.

We now offer a unification of bots and linkets. See FIG. 10. Mobile 71 starts off with bot 72 present. The user Ann asks the bot about some service. Perhaps the user says "I want to learn music" and she goes into some dialog with the bot. The bot is assumed to know of linket Registry 102. It asks Registry 102. This is shown as an arrow between bot 72 and Registry 102. Equivalently, bot engine 70 contacts Registry 102.

Using search results returned by the Registry, the bot suggests a linket "Jane Music Lessons", as depicted by item 103. The bot finds from the search results that the linket maps to a bot interface or to a deep link 104. The latter is for the installation of an app on Mobile 71. The bot says to Ann, "Say yes if you want to talk to a music server. Say no if you want to use the music app".

If Ann says yes, she picks the linket mapping to bot interface 75. Bot 72 connects to bot interface 75 and Ann interacts via the bot for a music lesson.

If Ann says no, she picks the linket mapping to deep link 104. Bot 72 uses the deep link to install the app whose id is in the deep link (if the app is not already on Mobile 71). If the deep link has an address of a music teacher (Jane), then the app is run and connects to her app instance. Or the app is run and talks to its app server, and via the server, Ann might interact with Jane.

Figure 10:
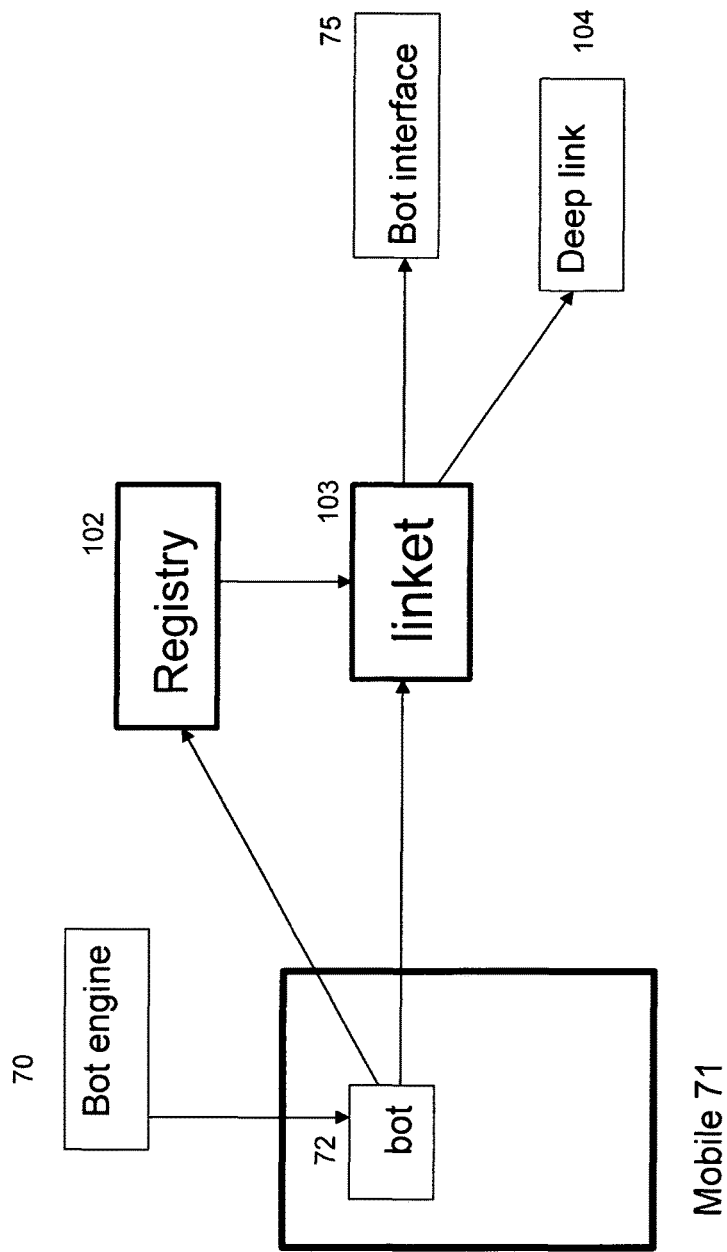
FIG. 10 shows a bot getting a linket from the Registry.

In FIG. 10, the bot interface 75 and deep link 104 might point or be part of the same Server 74. That is, deep link 104 could have the id of app 73 in FIG. 7.

But FIG. 10 is more general. There is no requirement that bot interface 75 and deep link 104 refer to the same underlying logic engine 77. The owner of linket 103 might have her linket pointing to a deep link of an app that is from a different firm from that making the bot interface.

Figure 11:
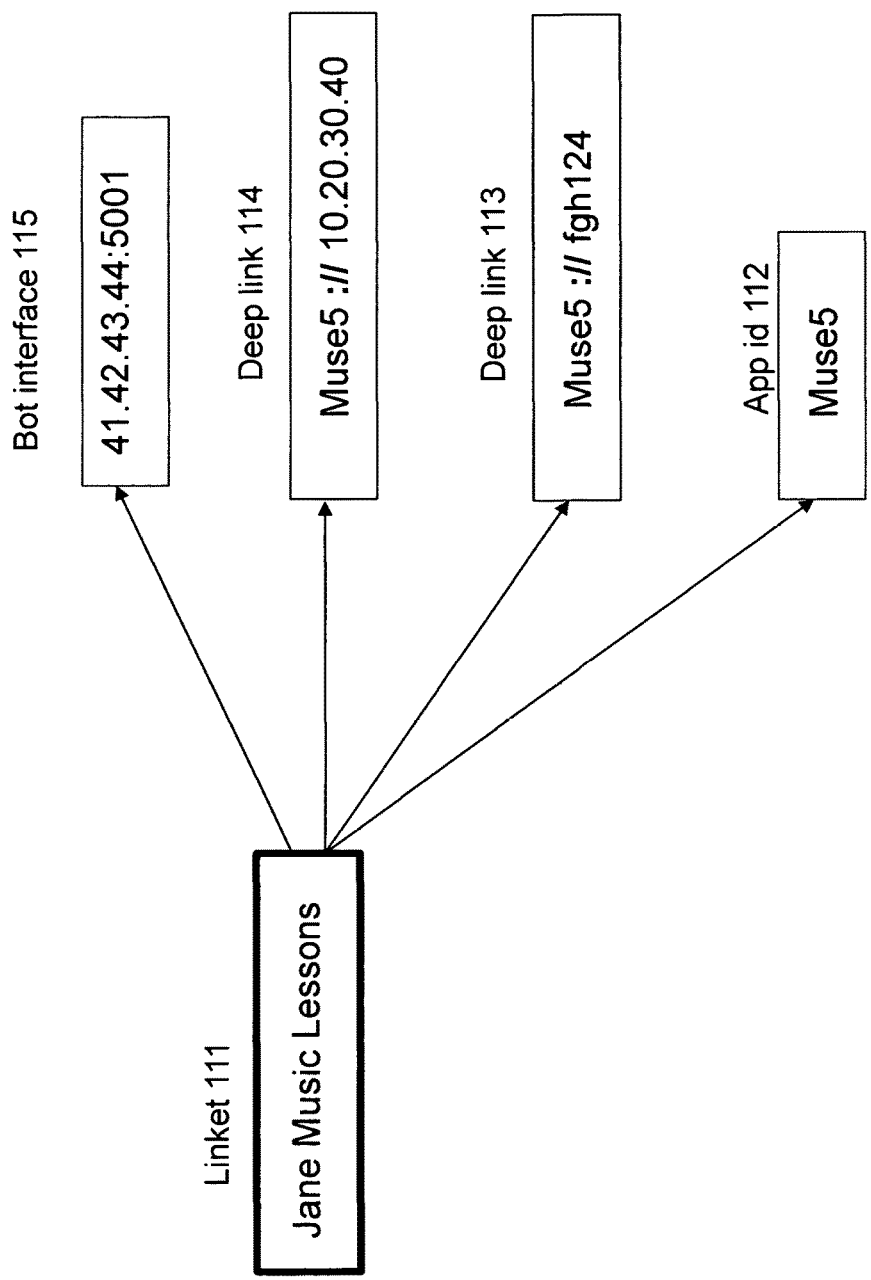
FIG. 11 shows a linket pointing to a bot server, deep links and an app id.

FIG. 11 shows the cases. Linket 111 is Jane's linket. The Registry has one or more of the mappings in the figure. App id 112 is where the linket maps just to the app id. This is for the case where an app can be installed from an app store, and the app would boot up in its home page.

Deep link 113 takes this further. The deep link has an alphanumeric code. The code could map to a product page. So the app is installed and run and the code is passed to it. The app shows the product page. This code is effectively a Stock Keeping Unit (SKU) of that product. At this time of writing, various startups in deep links are doing this.

Deep link 114 is the deep link of our submissions. It encodes the network address of an computer program that will answer the instance of muse5 run on Ann's device. Often, that computer program will be another instance of muse5.

There could be multiple instances of deep link 114. For example, when several people are available to tutor students, and each tutor has a maximum number of students.

Deep link 113 has a different interpretation, where it is the equivalent of deep link 114. Jane's teacher app instance might connect to the muse5 app server. The latter gets Jane's device address (10.20.30.40) from the packet header of Jane's message. It makes a code fgh124 and sends this to Jane's instance. The latter promotes this on the network by various means. Including by uploading it to the Registry in a deep link 113 that corresponds to her linket 111. A user Ann gets deep link 113 by clicking on the linket. Her device installs muse5 and her muse5 instance sends fgh124 to the muse5 server. The latter sends Jane's address (10.20.30.40) to Ann's instance. The latter then contacts Jane's instance.

The linket 111 also can point to bot interface 115. This is depicted as a network address. Specifically an Internet address in IPv4 format, with a port number 5001. Note the difference between this 115 and the others of FIG. 11. There is no app id in 115; which is a point of a bot interface.

There might also be several instances of bot interface 115. Pointing to bot interfaces made by different companies, for example.

When the Registry is queried with a linket, there could be a parameter in the query to indicate which of the above 4 types are desired as answers. The Registry would reply accordingly.

Also, if no such parameter is used, the Registry could reply with instances of the above 4 cases, formatted in a publicly defined way. The device getting the reply would have been programmed to parse the reply. It vows the format of the reply.

FIG. 11 also has a temporal meaning. Read the items on the right hand side, starting from the bottom, at app id 112 and ending at the top, at bot interface 115. This is the order, in increasing time, of the implementation of the items, separate from the use of linket 111.

Namely, using just app id 112 to install a given app from an app store was the first to occur. When a user clicks on an app in an app store, to install it on her device, this is essentially what is happening. Or when a user has a web page or app screen and it shows an app id, to enable the installation of that app. This dates from 2008 or earlier.

Second, the various startups that were funded to do deep links implemented deep link 113. Their deep links had what was essentially a SKU as the item after the app id. We elaborate on this. Some startups might not have used the format for their deep links of item 113. There is no industry standard for a deep link, unlike for URLs, say. However, their deep links could be put into and understood in the format of item 113.

Third, deep link 114 was described in our submissions from 2015.

Fourth, the bot interface 115. Described in this submission (2016). Note that for item 115, the originality is in the meaning of what is behind the network address and the mapping from a linket to 115. The contents of item 115 are a standard Internet address, and this format has been used since the 1970s.

In FIG. 11, consider bot interface 115. It is represented as an example written in raw IPv4 notation. If, say, the IP address is constant, it might have a domain associated with it, like somewhere.com. So item 115 might be somewhere.com:5001. This would be unlike the case of deep link 114 where the address is that of a mobile device and thus could vary frequently (like on the time scale of a day or less).

Bot interface 115 could also be written in a higher level protocol notation, like http or https for example. In this case, item 115 would be in the format of a conventional URL.

Figure 12:
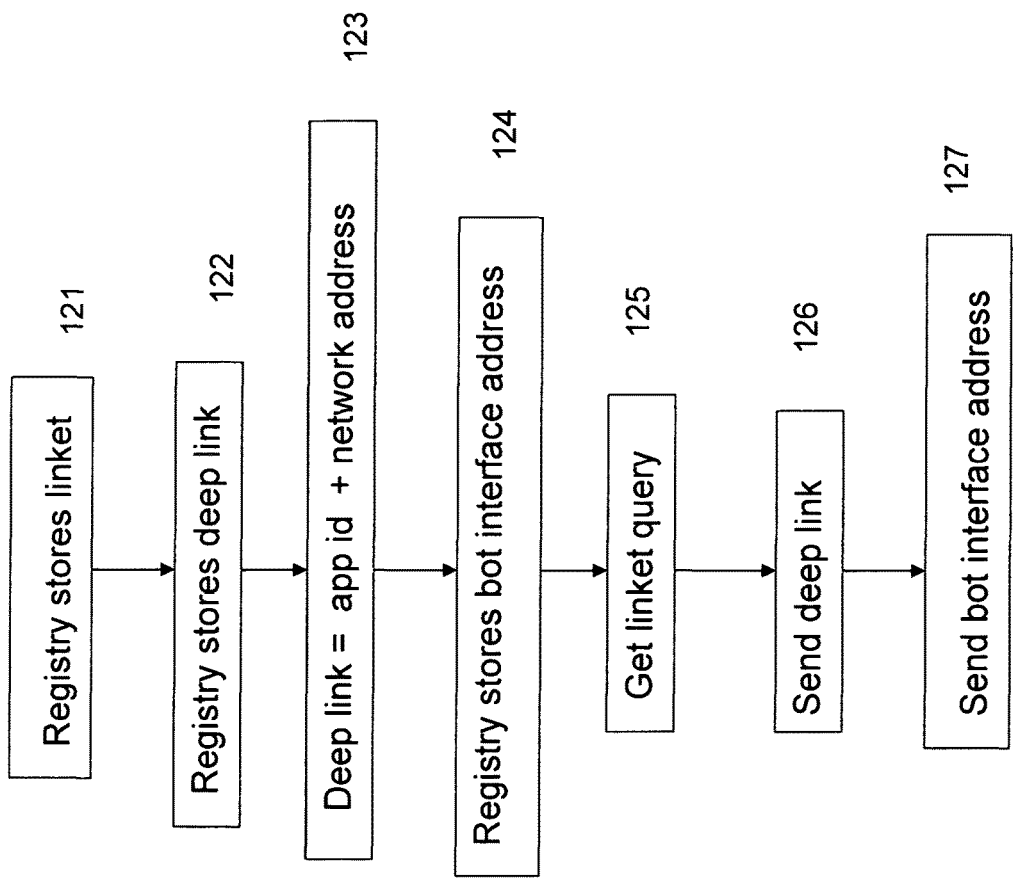
FIG. 12 is a flow chart of a linket with a deep link and a bot interface.

FIG. 12 is a flow chart summarising the above. Item 121 is the Registry storing a linket. Item 122 is the Registry storing a deep link for that linket. Item 123 is the explanation that the deep link has an app id and an id of a network address.

Item 124 is the Registry storing a bot interface address for that linket. Item 125 is the Registry getting a linket in a query from an external device, possibly a mobile device. Item 126 is the Registry replying with the deep link for that linket. Item 127 is the Registry replying with the bot interface address for that linket.

7: App Interacting with Bots;

FIG. 8 permits a variant 2 person interaction. Jane is the tutor who uses tutor device 81. Ann is the user of mobile device 71. Ann might interact via her bot 72, while Jane could use her app 83, that interacts with app server 76. Both users end up using the underlying logic engine 77. But with different immediate user interfaces.

One reason could be that Jane's device 81 has a large screen. It might be non-mobile (a PC for example). She prefers the ease of the large screen. While Ann has a mobile device so prefers to use a bot.

Another reason could be that Jane has a class of several students, Ann being one. It is more convenient for Jane to interact via a visual means that lets her see a summary of her students' activities. Especially if Jane has a large screen. Whereas each student might only need to see her own work, and so could just use a bot.

In FIG. 8, this is where each student corresponds to a separate instance of Mobile 71, and these multiple instances each connect to bot interface 75. While there is one instance of Tutor device 81, with app 83 connecting to app server 76.

A variant is where tutor Jane uses an app. Some students use a bot, other students use the app.

Note that in this section, thus far, there is no explicit use of a Registry.

Figure 13:
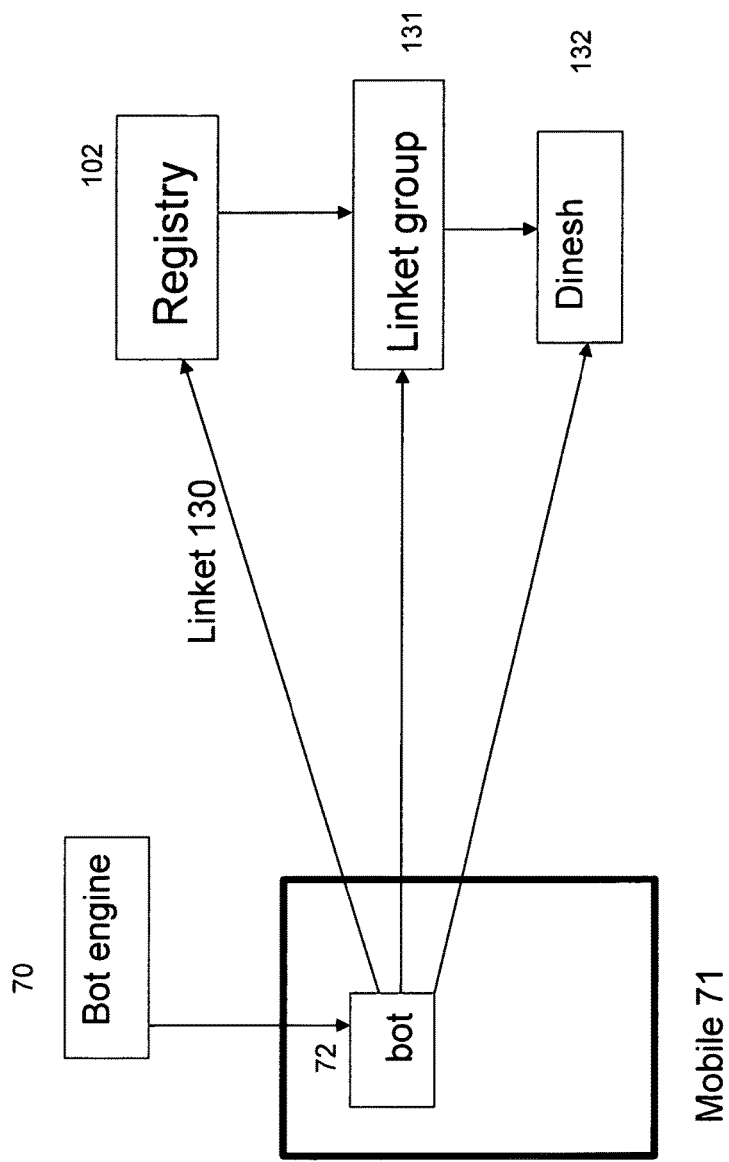
FIG. 13 shows a user with a bot interacting with a linket group user.

We can combine a linket group with the use of a bot. See FIG. 13 for an example. The user of mobile 71, Ann, uses her bot 72 to send a linket 130 to Registry 102. She wants to find the users of the linket. The Registry returns Linket group 131. She asks her bot to find more information about the users in the group. By extra interactions with the bot, she narrows this down to one user, Dinesh 132. Via the contact information about him in the linket group data, she uses her bot to interact with him. Perhaps in a real time manner if he is accessible in real time via his contact information. Or perhaps in an asynchronous manner, like via email. Or, with the contact information furnished via her bot, she can halt using the bot and just, for example, send Dinesh an email or Instant Message.

8: Using a Bot to Search the Registry;

Suppose the user of mobile 71, Ann, wants to find a linket on a given topic. Or she does not know of linkets or she does not specify a given linket, but she knows the topic. She uses her bot to search the Registry database. By typing to interact with her bot or by speaking to the bot, or a combination of both. The database is well suited to such a search. It is mostly structured data. For unstructured data, owners of linkets have incentive to write accurate descriptions of what their linkets do. They are likely to use the most common terms in their industries as part of these descriptions. Thus the unstructured data might be taken as canonical (ie. reliable), barring any specific evidence to the contrary.

The Registry can reply to her bot with a linket.

But to her the linket might be only a means to an end. She wants to interact with a computer program or person on some topic. The interaction can be via an app (so she needs a deep link) or via a bot (so she needs a bot interface). When she first interacts with her bot, to hook up to the Registry, she might specific her preference. Or her bot might infer from her previous interactions with the Registry that she prefers one choice. Or her bot can suggest to her, based perhaps on the properties of her device, one choice. For example, if her device only has a small screen, the bot might recommend that she use a bot interface instead of an app.

Her bot can interact with the Registry to tell or suggest to it that she wants a linket that lets her interact in her preferred way. If say she prefers a bot interface, the Registry uses this as a criterion. This can be if there are several linkets that fit her search requirements, especially if she just gave a topic and not a linket name. The Registry uses her preferences to cull the linkets on that topic. It improves her experience with searching.

Her bot can also ask her, or let her tell it, extra criteria that might be used by the Registry. For example, the Registry may have information about any humans who provide the deep links or can interact via a bot interface. She might say that she prefers a female instructor. Or an instructor from a given country. These requirements might be extractable by her bot from her interactions with it, because they are fairly structured parameters. And by passing these to the Registry, the Registry has more data to help its search.

I claim:

1. A method of a Registry server initiating live communication between users on a network;
   wherein each user has a user device on the network;
   wherein the Registry obtains a linket and a set of associated deep links from a first user device;
   wherein the Registry stores the linket and the set of associated deep links in a database;
   wherein the linket is a Unicode string;
   wherein the linket is a label of a deep link;
   wherein each deep link comprises of an app id and a network address id;
   wherein each deep link comprises of a different network address id;
   wherein at the network address of each deep link is a user device;
   wherein the Registry gets a query from a second user device Chi on the network;
   wherein the Registry extracts the linket from the query;
   wherein the Registry finds a deep link from the set;
   wherein the finding of the deep link, by the Registry, constitutes comparing properties of the devices at the addresses specified in the deep links, against properties of Chi;
   wherein the Registry sends the deep link to Chi,
   wherein the Registry gets a message from a user device Psi at a deep link address; wherein the message requests that the Registry remove the deep link from the set of deep links;
   wherein the Registry removes the deep link from the set of deep links.

2. The method of claim 1,
   wherein the Registry gets a message from Psi;
   wherein the message requests that the Registry add the deep link to the set of deep links;
   wherein the Registry adds the deep link to the set of deep links.

* * * * *